Jan. 8, 1963  C. A. BOOKER, JR  3,072,888
TOTALIZING SYSTEM
Filed Jan. 6, 1960  3 Sheets-Sheet 2

United States Patent Office 3,072,888
Patented Jan. 8, 1963

3,072,888
TOTALIZING SYSTEM
Clyde A. Booker, Jr., Churchill Boro, Pa., assignor to Westinghouse Electric Corporation, East Pittsburgh, Pa., a corporation of Pennsylvania
Filed Jan. 6, 1960, Ser. No. 799
12 Claims. (Cl. 340—172.5)

This invention relates to totalizing systems and it has particular relation to totalizing systems designed to totalize the outputs of watt-hour meters.

Impulse totalizing systems are well known in the art. In such a system several input impulse quantities to be totalized are supplied to an impulse totalizing device. An impulse output is derived from the device which is representative of the total of the input quantities to be totalized. The output may be supplied to any suitable translating device such as an impulse-operated demand meter.

In accordance with the invention a separate sub-assembly is provided for each of the input quantities to be totalized. Each of the sub-assemblies includes a storage device having a "set" condition and a "reset" condition. Each of the storage devices is operated to its set condition in response to a predetermined number of its associated input impulses. The storage devices are successively interrogated or scanned repetitively. During the scanning or interrogating operation, each of the storage devices which is in its set condition is reset or restored to its reset condition. Each resetting operation of a storage device provides an output pulse which is applied to a common bus. Thus, the pulses derived from the common bus represent the total of the input impulses which are to be totalized.

In a preferred embodiment of the invention each of the sub-assemblies also includes an input device having a set condition and a reset condition. The input device is operated between these conditions by the associated impulses representing one of the input quantities to be totalized. For example, the input impulses may be derived from a contact device on a conventional watt-hour meter. In response to the transition of the input device from one to the other of its conditions, the associated storage device is operated to its set condition.

Each of the sub-assemblies also includes an interrogation device. The interrogation devices of the sub-assemblies are arranged in a ring counter system. The ring counter arrangement places only one of the interrogation devices in an operative condition at a time and the interrogation devices are successively placed in operating condition. When it is in operating condition each of the interrogating devices resets its associated storage device if such storage device is in its set condition.

The pulse output from the common bus may be supplied directly to a translating device such as an impulse-operated demand meter, preferably, however, the pulses are supplied to an output device having a set condition and a reset condition. Each pulse derived from the bus may be employed for transferring the output device from its reset condition to a set condition. The output device may be reset by successive timed input pulses, at least one of the pulses being supplied between each pair of successive output pulses. Alternatively, the output device may be placed in its set condition by means of alternate output pulses, the remaining pulses be employed for resetting the output device. The output device is designed to generate resultant pulses of sufficient magnitude to operate suitable translating means.

Preferably, the input, storage, interrogation and output devices are constructed of transistors arranged to provide a bistable or flip-flop operation.

In a preferred embodiment of the invention all of the sub-assemblies together with a suitable power supply and a device for providing timed pulses for resetting operations are mounted in a chassis unit which is detachably associated with a receiver or casing unit. Electrical connections between the chassis unit and terminals on the receiver unit preferably are effected by means of switches which may be readily opened to permit removal of the complete chassis unit from its associated casing unit.

It is therefore an object of the invention to provide a pulse-operated storage device having a set condition and a reset condition together with an interrogating device for repetitively interrogating the condition of the storage device.

It is a further object of the invention to provide a system as defined in the preceding paragraph wherein the devices are bistable devices.

It is a further object of the invention to provide a totalizing system comprising a plurality of sub-assemblies, each including a storage device having a set condition and a reset condition together with an interrogating device and control means for operating the interrogating devices of the sub-assemblies interrogate successively the conditions of the storage devices.

It is an additional object of the invention to provide a totalizing system comprising a plurality of sub-assemblies, each of the sub-assemblies having a storage device operable between set and reset conditions together with an interrogating device for interrogating the condition of the associated storage device. The interrogating devices of the sub-assemblies being arranged in a ring circuit for successively rendering the respective interrogating devices effective for an interrogating operation.

Other objects of the invention will be apparent from the following description taken in conjunction with the accompanying drawings, in which:

FIG. 2A may be placed above FIG. 2B in order to show the complete totalizing system represented thereby.

Figure 1:
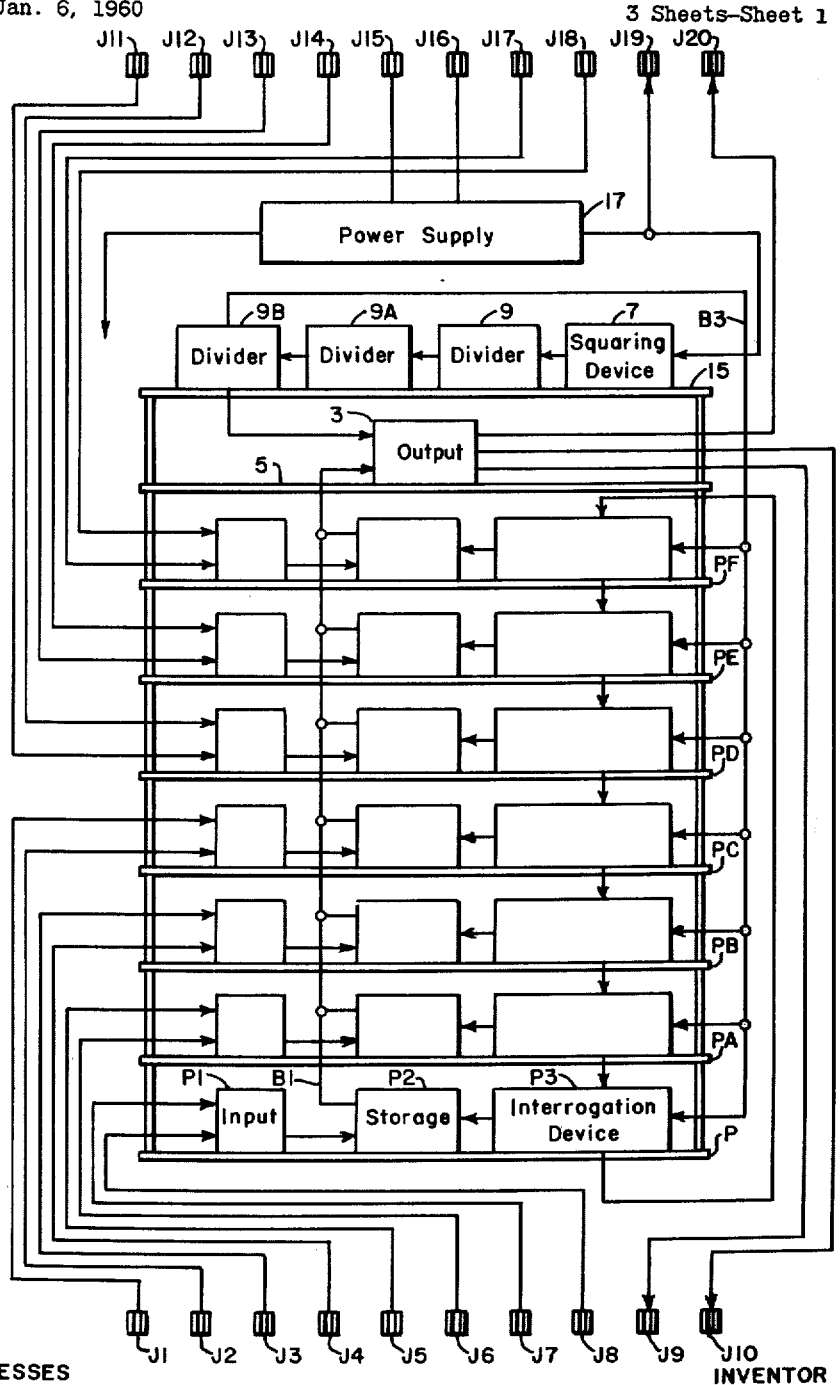
FIGURE 1 is a schematic view with parts shown in block form of a totalizing system embodying the invention.

Referring to the drawings, FIG. 1 shows a totalizing system for totalizing impulses derived from a plurality of indepedent sources. The totalizing system includes a sub-assembly mounted on a panel P. This subassembly comprises an input device P1 having two inputs applied thereto. One of the inputs is utilized to place the input device into a set condition, the remaining input is employed for resetting the input device.

The output of the input device P1 is supplied to a storage device P2 for the purpose of placing the storage device into a set condition. The resetting of the storage device P2 is effected by a pulse derived from an interrogating device P3. When the storage device P2 is reset it delivers a pulse to a bus B1.

One assembly or panel similar to the panel P is provided for each of the impulse quantities to be totalized. In the specific embodiment of FIG. 1, seven similar panels P and PA to PF are provided. The subassemblies mounted on these panels are similar except for one electrical connection which will be discussed below.

The outputs from the storage devices are applied through the common bus B1 to an output device 3 which is mounted on a panel 5. Each pulse so applied places the output device into a set condition. The output device is reset between each pair of successive input pulses applied thereto.

In order to interrogate or scan the storage devices successively, the interrogating devices are arranged in a ring counter circuit in such a manner that only one of the interrogating devices is effective at one time for resetting its associated storage device. Consequently, coincident pulses cannot be delivered to the output device. The relationship of the pulse rate is such that only one input pulse can be supplied to one of the storage devices between successive scanning operations of a storage device.

The position of the effective interrogating device is advanced successively around the ring by means of timed pulses supplied through the bus B3. These pulses may be produced in any desired manner. In a preferred embodiment of the invention, they are derived from a source of alternating current which may have a frequency of 60 cycles per second. The alternating current is supplied to a squaring device 7 and the output of the squaring device is successively divided by dividers 9, 9A and 9B, all of which are mounted on a panel 15. This source of timed pulses also may be employed to provide resetting pulses for the output device 3.

A power supply 17 is provided for applying suitable voltages and currents to the various devices. Preferably, all of the components of FIG. 1 are mounted on a chassis which is detachably received in a casing in a manner similar to that shown in the Chapman et al., Patent 2,388,675, issued November 13, 1945. To this end all electrical connections to the components illustrated in FIG. 1 may be made through contact jaws J1 to J20. These contact jaws may be detachably connected to terminals on the casing which receives the chassis by detachable knife-blade switches in the manner discussed in the aforesaid Chapman et al. patent.

As previously pointed out, the number of panels to be employed depends on the number of sources to be totalized. In order to simplify the presentation of the invention, it will be assumed that only the three panels P, PA and PB together with the panels 5 and 15 and the power supply 17 are required. These are illustrated in detail in FIGS. 2A and 2B.

Inasmuch as the panels P, PA and PB carry similar components, the following discussion will be directed largely to the components carried by the panel P. Similar components on the panels PA and PB will be identified by the same reference character followed by the suffix A or B to denote that the component is on the panel PA or PB. For example, the resistors R27, R27A and R27B are similar resistors located respectively on the panels P, PA and PB.

It will be assumed that the impulses which are to be totalized are supplied by conventional contact devices on watt-hour meters W, WA and WB. In FIG. 2B the watt-hour meter W is represented by the shaft of the watt-hour meter which carries a cam. This cam in rotating moves a movable contact W1 from engagement with a fixed contact W2 into engagement with a fixed contact W3. Continued rotation of the cam restores the movable contact to engagement with the fixed contact W2. All of the movable contacts are connected to a bus B5 and an alternating voltage is applied between this bus and ground in a manner which will be discussed below.

A number of bistable or flip-flop devices are employed in the embodiment of the invention here illustrated. Each of the bistable devices may be of conventional construction and may employ conventional components such as magnetic cores or electronic tubes. However, in a preferred embodiment of the invention each of the bistable devices is constructed of transistors and it will be assumed that the transistors are of the p-n-p type.

Referring to the input device P1, it will be noted that two transistors T1 and T2 have their emitters connected to the ground bus G through a common resistor R10. The collectors of the two transistors are connected respectively through resistors R9 and R11 to a bus B7 which is maintained at a negative potential with respect to ground. The bases of the transistors T1 and T2 are connected respectively through resistors R8 and R13 to the ground bus G. The base of the transistor T1 is connected through a resistor R7 to the collector of the transistor T2 and the base of the latter transistor is connected to the collector of the transistor T1 through a resistor R12.

When the movable contact W1 is in engagement with the fixed contact W2, an alternating voltage is applied across the resistors R4 and R5 in series. A portion of the voltage which appears across the resistor R5 also is applied across a series circuit including a resistor R13, the rectifier D2 and the resistor R6 in series. Consequently, an input voltage appears across the resistor R13 which is a direct voltage sufficient to turn the transistor T2 on. This will be assumed to be the set condition of the bistable device or input device P1. Under such circumstances, the transistor T1 is in its off condition.

Let it be assumed next that the movable contact moves into engagement with the fixed contact W3, thus disconnecting the alternating voltage from the voltage divider made up of the resistors R4 and R5 in series. The alternating voltage now is applied across the resistor R1 and R2 in series. The portion of the voltage appearing across the resistor R2 is applied across the series circuit consisting of the resistors R3 and R8 and the rectifier D1. The rectified voltage appearing across the resistor R8 resets the input device by turning on the transistor T1 and turning off the transistor T2. At the same time, an output pulse is supplied through the capacitor C1 to the storage device P2. In this way, during rotation of the watt-hour meter W, the transistors T1 and T2 are alternately placed in conducting and non-conducting condition and for each complete rotation of the watt-hour meter an output pulse is supplied through the capacitor C1 to the storage device P2.

The storage device P2 includes a bistable device which is generally similar to that represented for the input device P1. Thus, the transistors T3 and T4 and the resistors R15, R16, R17, R19, R20, R21 and R22 of the storage device P2 correspond respectively to the transistors T1 and T2 and the resistors R7 to R13 of the input device P1.

In its reset condition the storage device P2 has its transistor T3 conducting and its transistor T4 nonconducting. An output pulse from the input device P1 is applied through the capacitor C1 and the rectifier D3 to the resistor R16. This pulse is in proper polarity to stop conduction of the transistor T3 and to turn the transistor T4 on. The storage device is now in its set condition. A resistor R14 is connected between the capacitor C1 and the collector of the transistor T3 to complete a charging path for the capacitor.

When the storage device is to be interrogated a pulse is applied through the capacitor C3 and the rectifier D5 to the resistor R22. This pulse is in proper polarity to stop conduction of the transistor T4 and to initiate conduction in the transistor T3. Thus, the pulse supplied through the capacitor C3 resets the storage device. During this resetting operation a pulse is applied through the capacitor C2 and the rectifier D4 to an output bus B9. A resistor R18 is connected between the capacitor C2 and the emitters of the transistors T3 and T4 to complete a charging for the capacitor.

Thus, for each rotation of the watt-hour meter W, a pulse is applied to the storage device to set the storage device. The storage device stores the pulse or remains in its set condition until it is interrogated by a pulse through the capacitor C3. As a result of such interrogation the storage device, if it is in its set condition, is reset and an output pulse simultaneously is delivered to the bus B9.

The interrogation device P3 is a bistable device which bears some resemblance to the input device P1. Thus, the transistors T5 and T6 and the resistors R25 to R30 correspond respectively to the transistors T1 and T2 and the resistors R7 to R13 inclusive.

The components on the different panels are the same except for the connection of the resistors in the R27 series.

These connections differ for the reason that the interrogation devices of all of the panels are connected in a ring counter circuit. To this end, the emitters of all of the P5 series of transistors are connected together. The emitters of all of the P6 series of transistors are connected together. By inspection of FIG. 2B it will be noted that one and only one of the resistors of the R27 series, in this case the resistor R27 is connected between the emitter of the transistor T6 and ground. Each remaining resistor of the R27 series is connected between the emitter of its associated transistor of the T5 series and ground. The interconnections of the interrogation devices to form a ring counter also includes a connection of the collector of the transistor T6 to the base of the transistors T5A through a resistor R31 and a rectifier D7. An additional connection of a similar type extends between the collector of the transistor T6A and the base of the transistor T5B and between the collector of the transistor T6B and the base of the transistor T5.

In the ring counter circuit only one of the transistors of the T6 series can be conducting or on at one time. Its associated transistor of the T5 series is the only transistor of this series which is in the nonconducting or off condition at the same time. These conditions of the two transistors are repeatedly stepped around the ring from interrogation device to interrogation device by pulses simultaneously applied across the resistors of the R30 series. For example, a pulse is supplied from the bus B3 through the capacitor C4 and the rectifier D6 across the resistor R30.

Let it be assumed that at the instant under discussion the transistor T6 is in a conducting or on condition and the transistor T5 is in a non-conducting or off condition. When the transistors were placed in these conditions a pulse was applied through the capacitor C3 and the rectifier D5 to reset the storage device P2.

It will be assumed that a pulse is now applied across each resistor of the R30 series. When the pulse is applied across the resistor R30 through the capacitor C4 and the rectifier R29, it is in proper direction to block conduction of the transistor T6. This transistor, consequently, is transferred to the off condition and the transistor T5 at the same time is transferred to the on condition. During this transfer, a pulse is supplied through the resistor R31 and the rectifier D7 to the resistor R25A. This pulse is in the proper direction to block conduction of the transistor T5A and the transistor T6A, consequently, is turned on. At the same time a pulse is applied through the capacitor C3A and the rectifier D5A to reset the storage device P2A.

In an analogous manner the next series of pulses to be applied to the interrogation devices from the bus B3 turns the transistor T6A off and turns the transistor T6B on to reset the storage device P2B. A following series of pulses will turn the transistor T6B off and turn the transistor T6 on to reset the storage device P2.

In this way each of the storage devices is interrogated in succession. If a storage device is in the set condition at the time it is interrogated, it will be reset and it will deliver a pulse to the bus B9. The ring counter should advance at a rate such that successive interrogations of a storage device are at an interval which is smaller than the shortest interval which can occur between successive pulse inputs to the storage device from the associated input device.

Figure 2A:
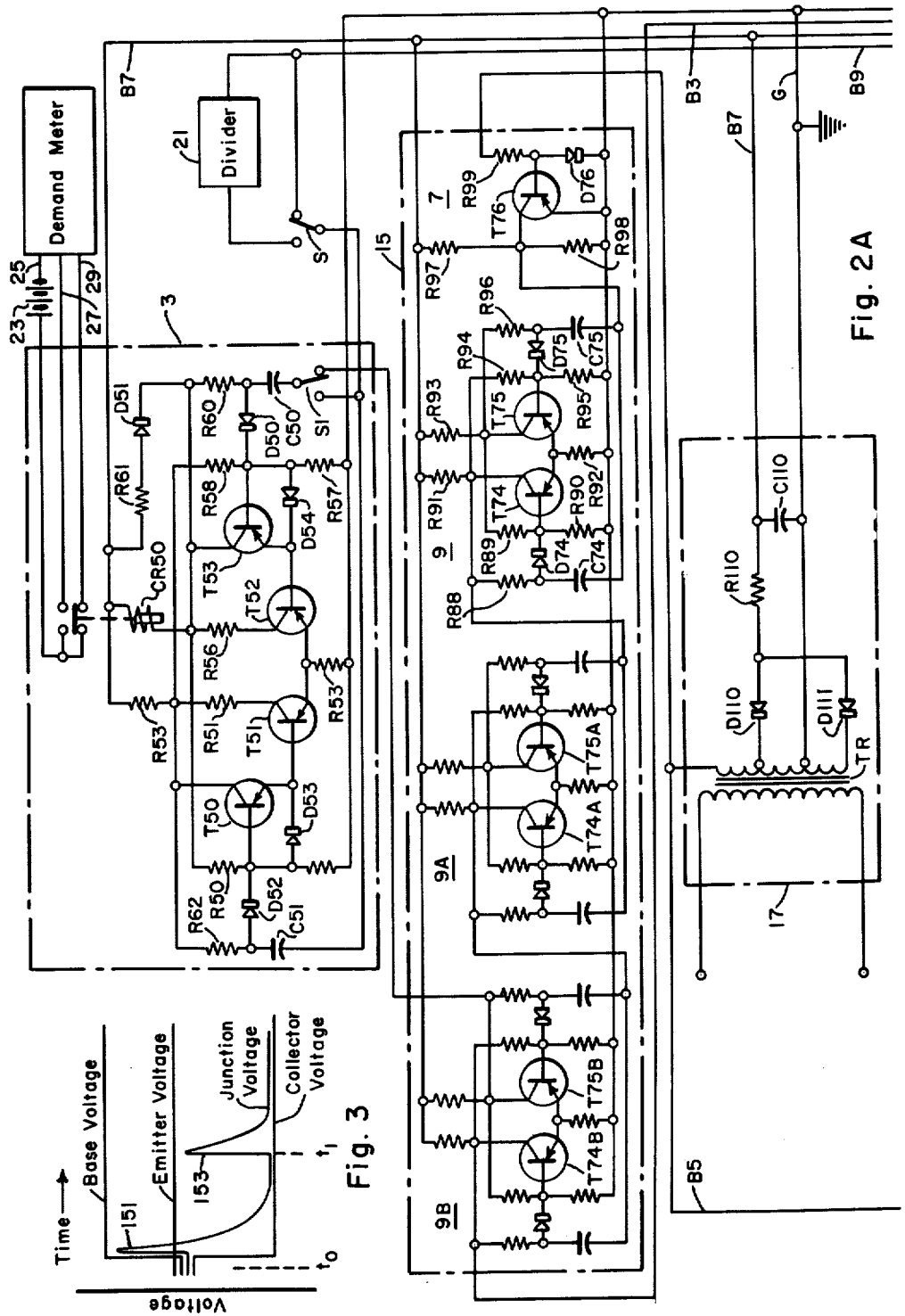
FIG. 2A is a schematic view showing a portion of a totalizing system embodying the invention.
Figure 2B:
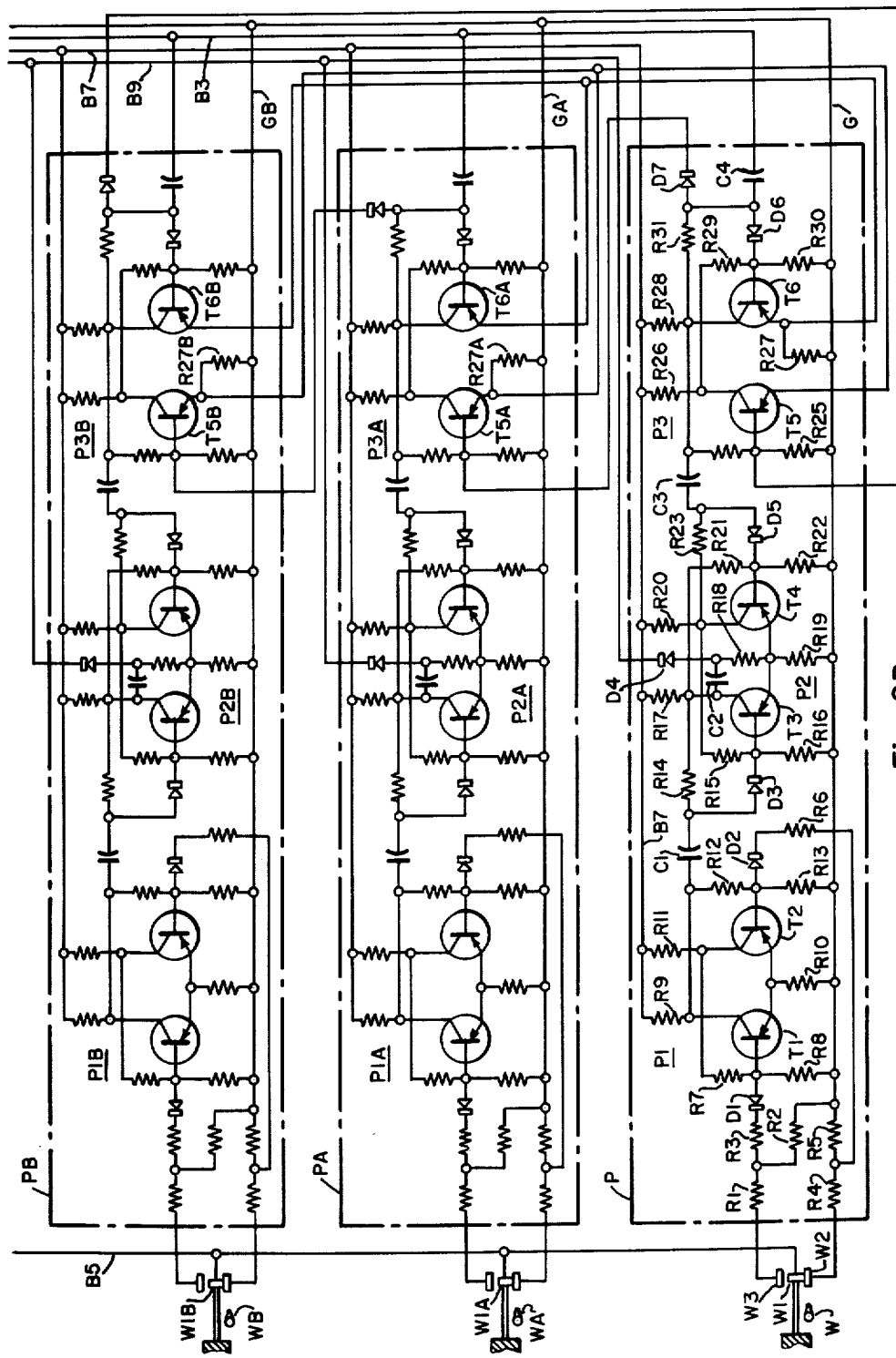
FIG. 2B is a schematic view showing the remainder of the totalizing system of FIG. 2A.

Turning now to FIG. 2A, it will be noted that a suitable power supply 17 is provided in order to supply suitable alternating and direct voltages to the associated equipment. To this end, a transformer TR may be provided having a primary winding designed for connection to a suitable source of alternating voltage. Such a source may be the conventional power source operating at a frequency of 60 cycles per second and a voltage of the order of 117 volts. A portion of the secondary winding of the transformer TR is connected between the bus B5 and the ground bus G in order to apply an alternating voltage thereacross. It will be recalled that this alternating voltage is employed for supplying inputs to the input devices through contact devices controlled by the associated watt-hour meters.

Another portion of the secondary winding is center tapped and associated with rectifiers D110 and D111 in a conventional manner to supply a direct voltage output across the bus B7 and the ground bus G. It will be noted that the polarity is such that the bus B7 is maintained at a negative potential with respect to the ground bus. A conventional filter comprising a resistor R110 and a capacitor C110 is employed for removing ripple from the direct current supplied through the associated equipment.

It will be recalled that the panel 15 carries equipment for generating a square wave alternating voltage of suitable frequency for control purposes. This equipment may be of any suitable design. In a preferred embodiment of the invention an alternating voltage is applied from the bus B5 and ground across a resistor R99 and a rectifier D76 in series. The rectifier is connected across the base and the emitter of a transistor T76. The collector of the transistor is connected to a point intermediate two resistors R97 and R98 which are connected between the bus B7 and ground. Thus, the transistor T76 and its associated components constitute a pulse-squaring stage which delivers across the resistor R98 a square wave alternating voltage having a frequency of 60 cycles per second.

The frequency of the voltage occurring across the resistor R98 is divided or reduced in any suitable manner. In the embodiment of the FIG. 2A the three similar binary dividers 9, 9A and 9B are connected in cascade to reduce the frequency of a voltage appearing across the resistor R98 to 7½ cycles per second. Components of the dividers 9A and 9B which correspond to a component of the divider 9 are identified by the same reference character followed by a suffix A or B respectively.

The divider 9 includes transistors T74 and T75 and resistors R89 to R95 which are similar respectively to the transistors T1 and T2 and the resistors R7 to R13 of the input device P1. The voltage appearing across the resistor R98 is applied across the resistor R95 through the capacitor C75 and the rectifier D75 and across the resistor R99 through the capacitor C74 and the rectifier D74. Charging paths for the capacitors C74 and C75 are provided respectively by the resistors R88 and R96. This voltage divider delivers an output between the collector of the transistor T74 and ground which has half the frequency of the input voltage to the divider. In a similar manner, each of the succeeding dividers 9A and 9B has its input voltage frequency halved to deliver between the bus B3 and ground an output having a frequency of 7½ cycles per second.

It will be recalled that pulses appear between the bus B9 and ground at a rate representative of the total of the powers being measured by all of the watt-hour meters. If desired, these pulses may be applied directly to a suitable impulse demand meter or they may be applied to the demand meter through a suitable amplifier. In the embodiment herein illustrated the pulses are applied through a manually-operable single-pole, double-throw switch S to the output device 3. If the manually-operable switch S is moved to its upper position as viewed in FIG. 2A, a divider 21 is included in the output circuit for the purpose of dividing or reducing the rate at which pulses are applied to the output device 3. Thus, if the divider 21 is a two-to-one divider the rate at which pulses are applied to the output device is half the rate at which pulses are applied to the bus B9. For present purposes, it will be assumed that the manually-operable switch S is in its lower position as shown.

The output device 3 includes a bistable device or flip-flop device having a sufficient output to operate a suitable output unit such as the relay CR50. When the relay is deenergized or dropped out, it connects a suitable source of electrical energy represented by a battery 23 to a demand meter or other translating device through conductors 25 and 29. When the relay is energized or picked up, it connects a battery to the demand meter through conductors 25 and 27. Conventional demand meters are available which respond to three wire inputs of this type.

Although bistable devices similar to those previously described may be employed for the output device 3, the specific device herein shown employs four transistors T50 to T53 which are arranged to operate in tandem. This permits an increase in the output power of the output device while embodying transistors similar to those employed in the remainder of the totalizing equipment.

By inspection of FIG. 2A it will be noted that the emitters of the transistors T51 and T52 are connected to ground through a common resistor R55. The collector of the transistor T51 is connected to the bus B7 through two resistors R53 and R54 in series. The collector of the transistor T52 is connected to the same bus through a resistor R56 and the coil of the relay CR50 in series. The resistors R54 and R56 assist in equalizing the temperature dissipation of the two transistors at high temperatures. The base of the transistor T51 is connected to ground through the rectifier D53 and a resistor R51 and to a point intermediate the relay CR50 and resistor R56 through the rectifier D53 and a resistor R50. In an analogous manner the base of the transistor T52 is connected to ground through a rectifier D54 and a resistor R59 and to a point intermediate the resistors R53 and R54 through a resistor R58.

The transistor T50 has the rectifier D53 connected across its base and emitter. The collector of this transistor is connected to a point intermediate the resistors R53 and R54.

The transistor T53 has the rectifier D54 connected across its emitter and base. The collector of this transistor is connected to a point intermediate the resistor R56 and the relay CR50. The input from the bus B9 is applied across the resistor R51 through a capacitor C51 and a rectifier D52. A resistor R62 is connected between the collector of the transistor T50 and the point intermediate the rectifier D52 and the capacitor C51. In an analogous manner an output from the divider 9B is applied across the resistor R59 through a single-pole double-throw switch S1, a capacitor C50 and a rectifier D50. A resistor R60 is connected between the collector of the transistor T53 and a point intermediate the rectifier D50 and the capacitor C50. By inspection of FIG. 2A it will be noted that the capacitor C50 is connected through the switch S1 to the collector of the transistor T75B. Consequently, the alternating-square-wave output supplied to the output device through the capacitor C50 is displaced in phase by 180° from the alternating-square-wave output supplied by the divider 9B to the bus B3.

Let it be assumed first that the transistors T50 and T51 are conducting or on. Under these circumstances, the transistors T52 and T53 are in their off conditions and the relay CR50 is deenergized and dropped out. At this stage it is assumed that one of the storage devices is reset and supplies through the coupling capacitor C51 an input across the resistor R51. This input is in a suitable direction for blocking or turning off the transistors T50 and T51. At the same time, the transistors T52 and T53 are turned on to energize and pick up the relay CR50. One-half cycle later a voltage is applied by the divider 9B through the capacitor C50 across the resistor R59 in proper direction to block or turn off the transistors T52 and T53. This deenergizes the relay CR50 which drops out. At the same time the transistors T50 and T51 are turned on. Consequently, an operation of the relay CR50 is obtained for each pulse supplied through the capacitor C51. A resistor R61 and a rectifier D51 are connected across the relay CR50 for the purpose of discharging energy stored in the winding of the relay.

Let it be assumed next that the manually operable switch S1 is moved to the left as viewed in FIG. 2A. Under these conditions the same input is applied from the bus B9 to both of the capacitors C50 and C51. If the transistors T50 and T51 are on the next pulse applied to both of the capacitors C50 and C51 acts to turn these transistors off. At the same time the transistors T52 and T53 are turned on to pick up the relay CR50. The next pulse applied to both of the capacitors C50 and C51 acts to reset the output device. Thus, the output device now acts as a two-to-one divider.

In FIGS. 2A and 2B a number of capacitors, resistors and rectifiers establish what may be termed "pulse steering gates." These may be tabulated as follows for the panel P, the divider 9 and the output device 3:

| Gate | Capacitor | Resistor | Rectifier |
| --- | --- | --- | --- |
| G1 | C1 | R14 | D3 |
| G2 | C3 | R23 | D5 |
| G3 | C4 | R31 | D6 and D7 |
| G4 | C75 | R96 | D75 |
| G5 | C74 | R88 | D74 |
| G6 | C51 | R62 | D52 |
| G7 | C50 | R60 | D50 |

Figure 3:
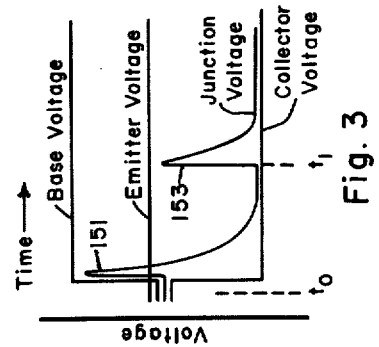
FIG. 3 is a graph showing certain voltage relationships with respect to time.

A typical operation of the gate G1 will be discussed with reference to FIG. 3. In FIG. 3 ordinates represent voltage relative to ground and abscissae represent time.

At a time $t_0$ it is assumed that the transistor T3 associated with the gate G1 is conducting. The base voltage of this transistor consequently is negative relative to the emitter. Shortly after the time $t_0$ a positive-going pulse 151 is applied to the left terminal of the capacitor C1 as viewed in FIG. 2B. The base now is driven to a positive voltage relative to the emitter and the transistor cuts off. The voltage of the junction common to the capacitor C1, the resistor R14 and the rectifier D3 decays to a voltage which is quite negative relative to the emitter.

Let it be assumed next that a second pulse 153 is applied to the capacitor C1 at a time $t_1$. This pulse does not drive the base to the emitter voltage and does not alter the state of the circuit.

Thus if a positive-going pulse is applied to a number of transistors, as in the ring circuit, the pulse steering gates assist in making certain that only those transistors which are in the conducting state will accept the pulse and assume the non-conducting state.

In the case of simultaneous input and interrogation pulses to the storage device, the storage device will accept only the input pulse. This avoids the possible loss of an input pulse.

Summarizing the overall operation of the totalizing equipment, the watt-hour meters W, WA and WB rotate at rates dependent on the powers that are being measured. These watt-hour meters act through their associated input devices P1, P1A and P1B to store pulses in the storage devices P2, P2A and P2B. The interrogating devices P3, P3A and P3B operate successively in a ring to interrogate only one of the storage devices at a time. If the storage device has a stored quantity therein at the time it is interrogated, it is reset and in the resetting operation supplies a pulse to the output device 3. Thus, the output device receives pulses at a rate dependent on the totalized power of the three electrical systems with which the watt-hour meters are associated. The output device then energizes an impulse demand meter through operation of the relay CR50.

Although the invention has been described with respect to certain specific embodiments thereof, numerous modifications falling within the spirit and scope of the invention are possible.

I claim as my invention:

1. In a device responsive to repetitive inputs, a bistable device responsive to a first energization for a first operation from a first condition to a second condition and responsive to a resetting energization for a resetting operation from the second condition to the first condition, reset energizing means for periodically supplying automatically pulses of said resetting energization to the bistable device, said bistable device including means responsive to simultaneous application of said first energization and said resetting energization to the bistable device for performing said first operation, and translating means operable in accordance with a function of the number of said resetting operations.

2. In a totalizing device responsive to repetitive inputs, a plurality of bistable devices each having independent input terminals for receiving an input independent of the other devices, each of said bistable devices being responsive to a first energization of the associated input terminals for a first operation from a first condition to a second condition and being responsive to a resetting energization for a resetting operation from the second condition to the first condition without effect on the operations of any of the other of said bistable devices, reset energizing means for supplying automatically pulses of said resetting energization in a plurality of repetitive cycles, each of said cycles comprising the supply of resetting energization one-at-a-time, in a predetermined order to each of said bistable devices, and translating means operable in accordance with a function of the number of resetting operations of said bistable devices from the second condition to the first condition.

3. In a totalizing device responsive to repetitive inputs, a plurality of bistable devices each having independent input terminals for receiving an input independent of the other devices, each of said bistable devices being responsive to a first energization of the associated input terminals for a first operation from a first condition to a second condition and being responsive to a resetting energization for a resetting operation from the second condition to the first condition without effect on the operations of any of the other of said bistable devices, operation energizing means for each of the bistable devices for repetitively supplying automatically pulses of said first energization at variable rates having a maximum value, reset energizing means for supplying said resetting energization in a plurality of repetitive cycles, each of said cycles comprising the supply of resetting energization one-at-a-time, in a predetermined order to each of said bistable devices, and translating means operable in accordance with a function of the number of resetting operations of said bistable devices from the second condition to the first condition, said cycles being repeated at a rate which is greater than said maximum value.

4. In a totalizing device responsive to repetitive inputs, a plurality of electroresponsive units; each of the units comprising a bistable device having first and second transistors, circuit means controlled by a first input energization for transferring the associated bistable device from a first condition wherein the first transistor conducts current in a first path and the second transistor blocks current flow in a second path to a second condition wherein the second transistor conducts current in the second path and the first transistor blocks current in the first path without effect on the remainder of said units, and a resetting stage for the bistable device comprising third and fourth transistors; circuit means connecting the third and fourth transistors in a ring counter circuit wherein the third transistor of only one of the units is conducting at any time and the fourth transistors of the remaining units are conducting, said ring counter having an input circuit effective for each energization thereof for transferring the conductive third transistor to the next stage around said ring counter, means responsive to each conduction of one of the third transistors while the associated unit is in said second condition for resetting such associated unit to the first condition, means for supplying repetitive inputs to said input circuit for repetitively cycling said ring counter, and output translating means responsive to a function of the transfers of all of said units from said second condition to said first condition.

5. In a totalizing device responsive to repetitive inputs, a plurality of electroresponsive units; each of the units comprising a bistable device having first and second transistors, circuit means controlled by a first input energization for transferring the associated bistable device from a first condition wherein the first transistor conducts current in a first path and the second transistor blocks current flow in a second path to a second condition wherein the second transistor conducts current in the second path and the first transistor blocks current in the first path without effect on the remainder of said units, and a resetting stage for the bistable device comprising third and fourth transistors; circuit means connecting the third and fourth transistors in a ring counter circuit wherein the third transistor of only one of the units is conducting at any time and the fourth transistors of the remaining units are conducting, said ring counter having an input circuit effective for each energization thereof for transferring the conductive third transistor to the next stage around said ring counter, means responsive to each conduction of one of the third transistors while the associated unit is in said second condition for resetting such associated unit to the first condition, means for supplying repetitive inputs to said input circuit for repetitively cycling said ring counter, each of the bistable devices having an output circuit effective for delivering a pulse for each transfer of the associated bistable device from the second condition to the first condition, electro-responsive translating means, and circuit means connecting said output circuits in parallel to said translating means.

6. In a device responsive to repetitive inputs, a bistable device responsive to a first energization for a first operation from a first condition to a second condition and responsive to a resetting energization for a resetting operation from the second condition to the first condition, reset energizing means for periodically supplying automatically pulses of said resetting energization to the bistable device, translating means operable in accordance with a function of the number of said resetting operations, a second bistable device for supplying said first energization to the first-named bistable device, said second bistable device comprising first and second input circuits, means responsive to energization of the first input circuit for operating the second bistable device from a third condition to a fourth condition and responsive to energization of the second input circuit for operating the second bistable device from the fourth condition to the third condition, and means responsive to an operation of the second bistable device between a pair of its conditions for supplying said first energization to the first-named bistable device.

7. In a device responsive to repetitive electrical inputs, first and second flip-flop devices, each of said flip-flop devices comprising first and second current-conducting devices each having respectively first and second main current paths and first and second control means each controlling the passage of current through the associated main current path, means responsive to a first energization of the control means while current is flowing in the first main-current path for terminating current conduction in said first main-current path and initiating continuing current conductors in the second main-current path, means responsive to a second energization of the control means while current is flowing in the second main-current path for terminating current conduction in the second main-current path and initiating continuing current conduction in the first main-current path, means responsive to operation of the first flip-flop device from current conduction in one of its main current paths to conduction in the other of its main current paths, for supplying the first energization to the second flip-flop device, means for repetitively supplying automatically pulses of said second energization to the second flip-flop device, and translating means responsive to a function of the transfers of conduction from one to the other of the main current path in said second flip-flop device.

8. In a totalizing device responsive to repetitive inputs, a plurality of units each comprising first, second and third bistable devices; each of said bistable devices comprising first and second main current paths, first input means effective when energized for transferring the associated bistable device from a first condition wherein the first main current path conducts substantial current and the second main current path blocks current to a second condition wherein the first main current path blocks current and the second main current path conducts substantial current, second input means effective when energized for transferring the associated bistable device from the second condition to the first condition, means responsive to transfer of the first bistable device from the first to the second condition thereof for energizing the input means of the second bistable device to transfer the second bistable device from the first condition to the second condition of the second bistable device, and means responsive to the transfer of the third bistable device from the first to the second condition thereof for energizing the input means of the second bistable device to transfer the second bistable device from the second condition to the first condition of the second bistable device; means for successively and automatically energizing the input means of the third bistable devices of the units in a predetermined order for successively transferring each of the plural third bistable devices successively and repetitively from the first condition to the second condition and simultaneously maintaining the remainder of the third bistable devices in the first condition, whereby the second bistable devices which are operated to the second condition by the associated first bistable devices are successively reset to the first condition, and translating means responsive to the operations of all of the second bistable devices from the second conditions to the first condition.

9. In a totalizing device responsive to repetitive inputs, a plurality of units each comprising first, second and third bistable devices; each of said bistable devices comprising first and second main current paths, first input means effective when energized for transferring the associated bistable device from a first condition wherein the first main current path conducts substantial current and the second main current path blocks current to a second condition wherein the first main current path blocks current and the second main current path conducts substantial current, second input means effective when energized for transferring the associated bistable device from the second condition to the first condition, means responsive to transfer of the first bistable device from the first to the second condition thereof for energizing the input means of the second bistable device to transfer the second bistable device from the first condition to the second condition of the second bistable device, and means responsive to the transfer of the third bistable device from the first to the second condition thereof for energizing the input means of the second bistable device to transfer the second bistable device from the second condition to the first condition of the second bistable device; means for successively and automatically energizing the input means of the third bistable devices of the units in a predetermined order for successively transferring each of the plural third bistable devices successively and repetitively from the first condition to the second condition and simultaneously maintaining the remainder of the third bistable devices in the first condition, whereby the second bistable devices which are operated to the second condition by the associated first bistable devices are successively reset to the first condition, and translating means responsive to the operations of all of the second bistable devices from the second condition to the first condition, said translating means comprising a fourth bistable device having first and second main current paths, third input means effective when energized for transferring the fourth bistable device from a first condition wherein the first main current path conducts substantial current and the second main current path blocks current to a second condition wherein the first main current path blocks current and the second main current path conducts substantial current, fourth input means effective when energized for transferring the fourth bistable device from the second condition to the first condition, circuit means connecting the third input means for energization from the plural second bistable devices in accordance with each operation of a second bistable device from the second condition to the first condition, means for periodically energizing the fourth input means, and output means responsive to a change in the condition of the fourth bistable device.

10. In a totalizing device responsive to repetitive inputs, a plurality of panels, means mounting the panels in parallel, spaced relationship, each of said panels having mounted thereon first, second and third bistable devices; each of said bistable devices comprising first and second main current paths, first input means effective when energized for transferring the associated bistable device from a first condition wherein the first main current path conducts substantial current and the second main current path blocks current to a second condition wherein the first main current path blocks current and the second main current path conducts substantial current, second input means effective when energized for transferring the associated bistable device from the second condition to the first condition, means responsive to transfer of the first bistable device from the first to the second condition thereof for energizing the input means of the second bistable device to transfer the second bistable means from the first condition to the second condition of the second bistable device, and means responsive to the transfer of the third bistable device from the first to the second condition thereof for energizing the input means of the second bistable device to transfer the second bistable means from the second condition to the first condition of the second bistable means; circuit means connecting the panels for successively energizing the input means of the third bistable devices of the units one-at-a-time, and circuit means connecting the second bistable devices of all of the panels to a common output circuit for energizing the output circuit in accordance with a predetermined change in condition of each of the second bistable devices.

11. In a totalizing device responsive to repetitive inputs; a plurality of panels; means mounting the panels in parallel, spaced relationship; each of said panels having mounted thereon a bistable device having first and second transistors, circuit means controlled by a first input energization for transferring the associated bistable device from a first condition wherein the first transistor conducts current in a first path and the second transistor blocks current flow in a second path to a second condition wherein the second transistor conducts current in the second path and the first transistor blocks current in the first path, and a resetting stage for the bistable device comprising third and fourth transistors; circuit means connecting the third and fourth transistors in a ring counter circuit wherein the third transistor of only one of the units is conducting at any time and the fourth transistors of the remaining units are conducting, said ring counter having an input circuit effective for each energization thereof for transferring the conductive third transistor to the next stage around said ring counter, means responsive for each conduction of one of the third transistors while the associated unit is in said second condition for resetting such associated unit to the first condition, means for supplying automatically repetitive inputs to said input circuit for repetitively cycling said ring counter, and output translating means responsive to a function of the transfers of all of said units from said second condition to said first condition.

12. In a totalizing device responsive to repetitive inputs, a plurality of storage devices, each of the storage devices comprising first input means effective when electrically energized by a first electrical quantity for transferring the storage device from a first condition to a second condition indicating receipt of said electrical quantity, a separate resetting device for each of the storage devices, each of said resetting devices being effective when electrically energized to produce a second electrical quantity while the associated storage device is in its second condition for resetting such associated storage device to its first condition, an output device responsive to each resetting operation of the storage devices for operation from a third condition to a fourth condition, restoring means responsive to energization by a third electrical quantity for restoring the output device from the fourth condition to the third condition, means cooperating with the resetting devices for successively applying automatically to each of the storage devices in succession one-at-a-time and repetitively the second electrical quantity for resetting each of the storage devices which is in the second condition, and means for applying said third electrical quantity to the restoring means between each pair of successive applications of the second electrical quantity to the resetting devices.

References Cited in the file of this patent
UNITED STATES PATENTS

| | | |
|---|---|---|
| 2,801,334 | Clapper | July 30, 1957 |
| 2,819,840 | Huntley | Jan. 14, 1958 |
| 2,851,677 | Crooks | Sept. 9, 1958 |
| 2,882,423 | MacSorley | Apr. 14, 1959 |